United States Patent [19]

Herb

[11] Patent Number: 4,566,610

[45] Date of Patent: Jan. 28, 1986

[54] HAND-HELD DEVICE FOR DISPENSING A MULTI-COMPONENT SUBSTANCE

[75] Inventor: Armin Herb, Peissenberg, Fed. Rep. of Germany

[73] Assignee: Hilti Aktiengesellschaft, Schaan Fürstentum, Liechtenstein

[21] Appl. No.: 532,578

[22] Filed: Sep. 15, 1983

[30] Foreign Application Priority Data

Sep. 15, 1982 [DE] Fed. Rep. of Germany ....... 3234250

[51] Int. Cl.[4] ............................................ G01F 11/00

[52] U.S. Cl. .................................... 222/137; 222/145; 222/391; 222/327; 74/148

[58] Field of Search .................. 74/148, 155; 222/391, 222/137, 145, 326, 327, 135; 604/224, 191, 209

[56] References Cited

U.S. PATENT DOCUMENTS 3,311,265 3/1967 Creighton et al. .................. 222/137
4,090,639 5/1978 Campbell et al. .................. 222/391
4,471,888 9/1984 Herb et al. .......................... 222/137

FOREIGN PATENT DOCUMENTS 1049464 2/1979 Canada ................................ 222/391

*Primary Examiner*—H. Grant Skaggs
*Attorney, Agent, or Firm*—Toren, McGeady, Stanger, Goldberg & Kiel

[57] ABSTRACT

A device for the measured or dosed dispensing of a putty-like or paste-like multi-component substance stored in separate containers includes a housing for holding the containers with a separate piston and piston rod unit for each container mounted in the housing. To prevent displacement of the piston-piston rod unit in the direction opposite to the dispensing direction, each piston rod is provided with a stop member. By pressing a hand lever pivotally mounted in the housing, a drive device connected to the lever grips the piston-piston rod units and moves them in the dispensing direction. The stop member permits movement in the dispensing direction but prevents the movement of the piston rod in the opposite direction when the hand lever-drive device is released. When the containers are to be replaced, a releasing member, located on the housing, releases the stop members from holding engagement with the piston rods so that the piston-piston rod units can be withdrawn from the containers in the direction opposite to the dispensing direction.

3 Claims, 3 Drawing Figures

HAND-HELD DEVICE FOR DISPENSING A MULTI-COMPONENT SUBSTANCE

SUMMARY OF THE INVENTION

The present invention is directed to a hand-held device for the measured or dosed dispensing of a putty-like or paste-like multi-component substance stored in at least two separate containers with a piston-piston rod unit associated with each container for dispensing the component in the container when the piston rod is axially displaced.

Because of their characteristics, such as a short setting time, high density, and the like, multi-component substances have been employed to an increasing degree in a variety of technical areas.

Devices for dispensing multi-component substances require an expensive construction as compared to devices used for dispensing single-component substances. Accordingly, a piston rod is required for the axial displacement of each piston used for displacing the component out of a container. The dispensing force applied to the piston rod is usually effected by a drive member acting on one of the piston rods. To afford the synchronous displacement of the piston rods, it has been known to connect the driven piston rod with the other piston rods by means of webs.

When highly viscous components are being dispensed, the driving force which must be transmitted from the driven piston rod to the other piston rods may be such that deformations of the piston rods take place with a resultant jamming of the combined piston-piston rod unit. To avoid such a situation, a drive arrangement has been used which acts simultaneously on all of the piston rods so that the interconnection of the piston rods is unnecessary.

In effecting the dispensing of the components usually a relatively small dispensing stroke of the piston rods is used and it is necessary for the drive to be released from the piston rods after each stroke so that subsequent strokes can be effected. To prevent any displacement of the piston-piston rod in the direction opposite to the dispensing direction when the dispensing drive is released, due to the pressure present within the individual containers, it has been known to provide a stop for the piston rod so that it does not move in the direction opposite to the dispensing direction. Such a stop member connected to one of the piston rods permits movement of the rod in the dispensing direction, but not in the opposite direction. To assure that the other piston rods do not move in the opposite direction, it is necessary that all of the piston rods be connected to one another by webs. In such an arrangement, considerable forces must be transmitted through the webs and it is possible that the pistons-piston rods may become jammed and not operate properly.

Therefore, it is the primary object of the present invention to provide a hand-held device for the measured dispensing of a multi-component substance so that any movement of the individual piston rods in the direction opposite to the dispensing direction is effected in a simple and problem-free manner.

In accordance with the present invention, each piston rod is provided with its own stop member preventing movement in the direction opposite to the dispensing direction.

Each piston rod is blocked independently of one another and at the same time by individual stop members. Accordingly, interconnection of the piston rods can be avoided. The holding of the piston rods, in accordance with the present invention, can also be effected based on the present invention when the rods are connected to one another, that is, for simultaneous dispensing movement or withdrawal movement.

The stop members can be constructed based on the so-called clamping eye-principle, that is, by a friction-locking engagement, or by actual catch members which engage in a form-locking manner in a notch or depression in the piston rod.

To prevent any continued dispensing of the individual components as a result of pressure built up in the individual containers, when the dispensing step has been completed, it may be necessary to release such pressure by releasing the stop member. In addition, in the operation of the device it must be possible to retract the piston rod out of the containers when the containers are emptied and need to be replaced. To achieve such a releasing action in a simple manner, it is advisable to provide a releasing member acting on each of the stop members for releasing the stop member from holding engagement with the piston rod. By means of the releasing member, all of the stop members are released simultaneously by actuating the releasing member. When the stop members are released, the piston rods can be withdrawn simultaneously. After the releasing member is released, the stop members return into holding contact with the piston rods and prevent any movement of the rods opposite to the dispensing direction.

To afford a compact construction of the device it is advantageous if each stop member is formed as a one-arm lever with the releasing member acting on the free end of each such lever. The stop members which can be pivoted about a rotating point, and can be returned into the holding position by means of a spring member so that the movement of the piston rod opposite to the dispensing direction is prevented. Accordingly, the biasing action of the spring member must be overcome to release the stop members.

The various features of novelty which characterize the invention are pointed out with particularity in the claims annexed to and forming a part of this disclosure. For a better understanding of the invention, its operating advantages and specific objects atttained by its use, reference should be had to the accompanying drawings and descriptive matter in which there are illustrated and described preferred embodiments of the invention.

Figures 1, 2A, 2B:
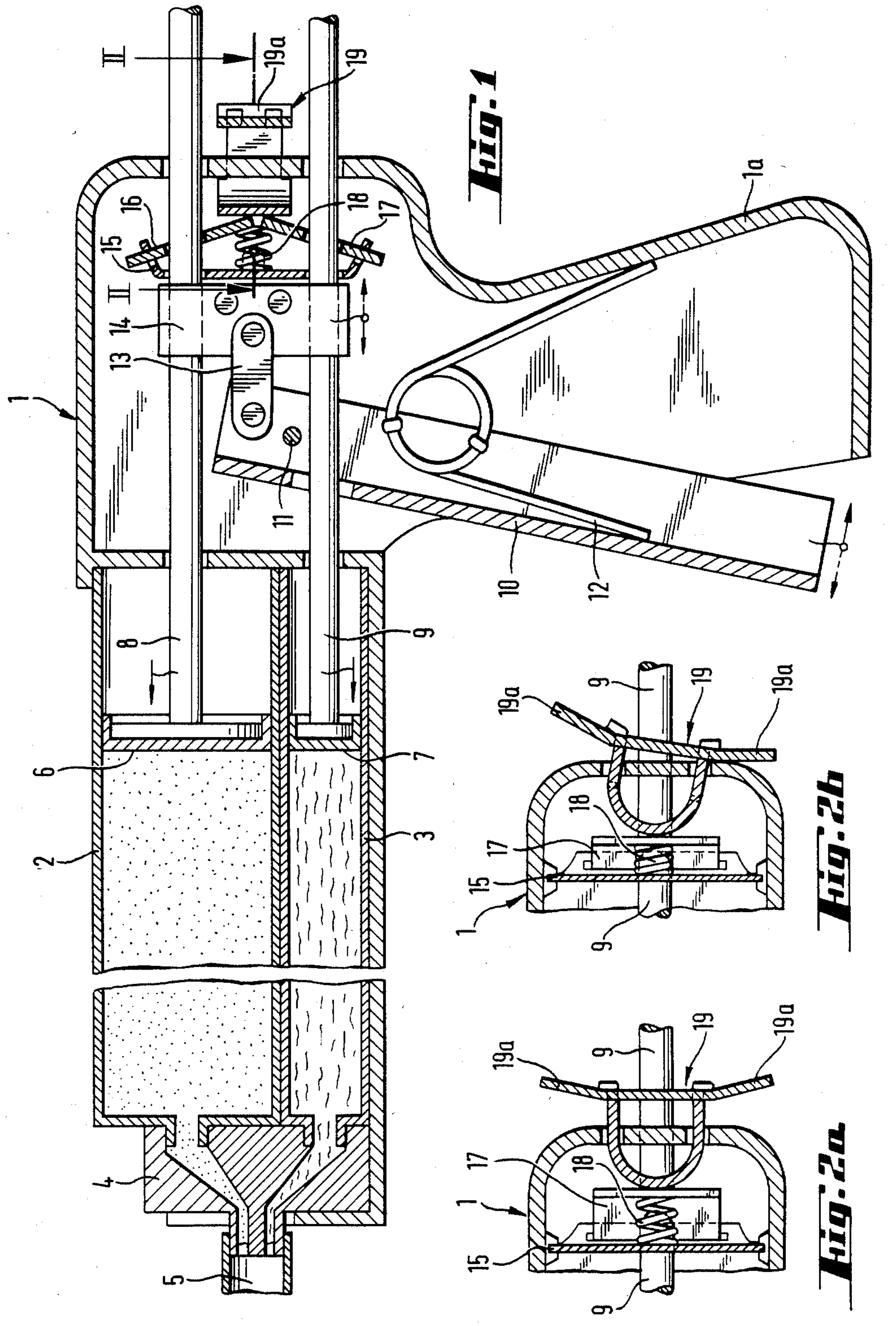
FIG. 1 is a sectional view through a device embodying the present invention.

FIG. *2a* is a section through the device shown in FIG. 1 taken along the line II—II with the disengaging element located in the at-rest position; and FIG. *2b* is a sectional view, similar to FIG. *2a,* however, with the disengaging element in the actuated position.

DETAILED DESCRIPTION OF THE INVENTION

As can be seen in FIG. 1, the device for dispensing a multi-component substance includes a housing 1 with a handle grip 1*a* projecting downwardly from the housing. Two separate containers 2, 3 are mounted in the housing 1. As viewed in FIG. 1, the left-hand end of the housing is the dispensing end and each of the containers 2, 3 open into a muzzle member 4. The muzzle member 4 has individual passageways extending from the containers 2, 3 into a mixing chamber 5 where the separate components from the containers are mixed together. A separate piston 6, 7 is provided in each of the containers 2, 3 and a piston rod 8, 9 is attached to each piston and extends from the piston in the direction away from the dispensing end of the housing. The pistons 6, 7 are displaced through the containers via the piston rods 8, 9. The piston rods 8, 9 are driven in the dispensing direction by a hand lever 10 located within the housing 1 and the handle 1*a*. Hand lever 10 is pivotally supported in the housing about a pin 11 extending transversely of the axial direction of the piston rods 8, 9. A torsion spring 12 is mounted in the handle 1*a* and bears against the hand lever 10 so that it pivots the hand lever about the pin 11 into the at-rest position of the lever. The end of the hand lever 10 within the housing 1 is connected to a drive device 14 by a strap member 13.

When the hand lever is actuated, it is pressed against the biasing action of the torsion spring 12 into the handle 1*a* and the drive device 14 grips the piston rods 8, 9 in a known manner and displaces the rods in the dispensing direction. The piston rods 8, 9 force the pistons 6, 7 into the separate containers 2, 3 and displace measured amounts of the components within the containers through the muzzle member 4 into the mixing chamber 5. When the hand lever 10 is released, it is returned to the at-rest position of FIG. 2*a* by the torsion spring 12 and the strap 13 moves the drive device 14 in the direction opposite to the dispensing direction. When the hand lever is released the gripping action by the drive device 14 on the piston rods is also released. On the opposite side of the drive device 14 from the hand lever 10, a web 15 is positioned in the housing 1 and extends transversely of the piston rods 8, 9. The web 15 has openings through which the piston rods extend. On the rearward side of the web there are two stop members 16, 17 arranged in releasable engagement with the piston rods 8, 9. The stop members 16, 17 are pivotally supported in the bent ends of the web 15. Each of the stop members 16, 17 has an opening through which one of the piston rods extend, that is, the piston rod 8 extends through the opening in the stop member 16 and the piston rod 9 extends through the opening in the stop member 17. In the position shown in FIG. 1, with the stop members 16, 17 extending obliquely of the piston rods 8, 9, the stop members are in friction engagement with the piston rods and prevent any movement of the piston rods in the direction opposite to the dispensing direction when the drive device 14 is returned to the released position shown in FIG. 1. A compression spring 18 is positioned between the web 15 and the free ends of the stop members 16, 17 spaced from the web 15 so that the frictional contact between the stop members and the piston rods is maintained. Mounted on the rear end of the housing, that is the opposite end from the mixing chamber 5, is a releasing member 19 disposed in engagement with the free ends of the stop members 16, 17.

As shown in FIGS. 2*a* and 2*b*, the releasing member 19 is made up of a U-shaped member 19*b* and a pair of actuating arms 9*a*. The bight portion of the U-shaped member 19*b* is in rolling contact with the free ends of the stop members 16, 17. The actuating arms 19*a* of the releasing member 19 are in engagement with the legs of the U-shaped member on the exterior of the housing 1.

In FIGS. 2*a* the releasing member 19 is in the at-rest position in contact with the stop members 16, 17, however, the spring 18 bearing against the stop members holds the releasing member so that the arms 19*a* are spaced from the housing. Accordingly, the stop members 16, 17 are retained in frictional engagement with the piston rods 8, 9. To release the stop members 16, 17, one of the actuating arms 19*a* of the releasing member 19 is pressed inwardly into contact with the housing 1 and the bight portion of the U-shaped member 19*b* presses the free end of the stop members 16, 17 against the spring 18 causing the spring to compress and allowing the stop member 16, 17 to assume a different angular position relative to the piston rods 8, 9 so that the frictional engagement with the piston rods is released whereby the piston rods can be moved in the direction opposite to the dispensing direction.

When one of the actuating arms 19*a* of the release member 19 is moved into the position shown in FIG. 2*b*, the stop members 16, 17 are pivoted about their point of engagement with the web 15 against the biasing action of the spring 18. When the the stop members compress the spring 18, they pivot into a position approximately perpendicular to the axes of the piston rods so that the frictional contact between the stop members and the piston rods is released and the rods can then pass through the openings in the stop members.

As can be seen best in FIG. 1, the stop members 16, 17 are formed as one-armed levers with the releasing member 19 in contact with the free end of each lever. In FIG. 1 the stop members 16, 17 pivot about points spaced outwardly from the piston rods 8, 9, however, the points of rotation of the stop members can also be located between the piston rods. In such an alternate arrangement the releasing member 19 would have to be constructed in a corresponding manner.

While specific embodiments of the invention have been shown and described in detail to illustrate the application of the inventive principles, it will be understood that the invention may be embodied otherwise without departing from such principles.

I claim:

1. A hand-held device for the measured dispensing of a putty-like or paste-like multi-component substance where the components are held in at least two separate containers, comprising a housing member for holding the separate containers, a piston for each said container for displacement through said container for pressing out the contents of the container, a piston rod for each said piston, said piston rods mounted in said housing and being axially displaceable for pressing said pistons into the containers for dispensing the contents of the containers, means associated with each said piston rod for holding said piston rods against displacement in the direction opposite to the direction in which the contents of the containers are dispensed, means for displacing said piston rods and said pistons in the dispensing direction, said means for displacing said piston rods including a drive member engageable with said piston rods, a web member located within said housing adjacent said drive member on the opposite side of said drive member from said pistons, said web member having openings therethrough through which said piston rods extend, said means for holding said piston rods comprising a stop member for each said piston rod, each said stop member being pivotally supported adjacent one end by said web member, and a releasing member in contact with the opposite ends of said stop members from the ends pivotally engageable with said web member, a spring extending between said web member and said stop members for biasing said stop members into holding engagement with said piston rods, and said releasing member mounted on said housing and in contact with said stop members so that by displacing said releasing member against the biasing action of said stop members can be displaced out of holding engagement with said piston

2. A hand-held device, as set forth in claim 1, wherein said stop members are one-armed levers with one end of each said lever in engagement with said spring, and said releasing member comprises a U-shaped member having a bight-shaped portion located within said housing and in engagement with the ends of said levers contacted by said spring, said U-shaped member having leg portions extending from said bight-shaped portion out of said housing, and at least one actuating arm connected to said U-shaped member on exterior of said housing for pressing said U-shaped against the biasing action of said spring for displacing said levers out of contacting engagement with said piston rods.

3. A hand-held device, as set forth in claim 2, including means for gripping said piston rods and moving said piston rods and said pistons in the dispensing direction, said means including a hand lever pivotally mounted in said housing, a gripping member connected to said hand lever and engageable with said piston rods for gripping said piston rods and displacing said piston rods in the dispensing direction, and a spring member engageable with said lever for biasing said lever in the direction opposite to the direction in which the lever is pivoted for effecting the movement of said piston rods and pistons in the dispensing direction.

* * * * *